United States Patent
Shogome (12)

(10) Patent No.: US 12,243,122 B2
(45) Date of Patent: Mar. 4, 2025

(54) DISPLAY CONTROL APPARATUS, CONTROL METHOD, COMPUTER-READABLE MEDIUM, AND PRODUCING METHOD

(71) Applicant: CANON KABUSHIKI KAISHA, Tokyo (JP)

(72) Inventor: Kohei Shogome, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 290 days.

(21) Appl. No.: 17/948,264

(22) Filed: Sep. 20, 2022

(65) Prior Publication Data
US 2023/0105800 A1    Apr. 6, 2023

(30) Foreign Application Priority Data
Oct. 1, 2021    (JP) ................. 2021-162642

(51) Int. Cl.
*G06T 19/00*    (2011.01)
*G06T 3/40*    (2006.01)
*G06T 3/60*    (2006.01)
*G06T 11/00*    (2006.01)

(52) U.S. Cl.
CPC ............... *G06T 11/00* (2013.01); *G06T 3/40* (2013.01); *G06T 3/60* (2013.01); *G06T 19/006* (2013.01)

(58) Field of Classification Search
None
See application file for complete search history.

(56) References Cited

U.S. PATENT DOCUMENTS

2020/0363931 A1    11/2020    Drobitko et al.

OTHER PUBLICATIONS

Jeremy Herbert, "LEGO Hidden Side J.B.'s Ghost Lab Review & App Gameplay", https://www.youtube.com/watch?v=bOPMDSs_aXk. 2019. (Year: 2019).*
Ngo et al., "Live Texturing of Augmented Reality Characters from Colored Drawings", IEEE, 2015. (Year: 2015).*

* cited by examiner

*Primary Examiner* — Nicholas R Wilson
(74) *Attorney, Agent, or Firm* — Carter, DeLuca & Farrell LLP

(57) ABSTRACT

A display control apparatus comprising at least one memory and at least one processor which function as: a detection unit configured to detect characteristic points of a product that a user is to produce, from a reality image; an orientation adjustment unit configured to adjust orientation of a model so as to match with the detected characteristic points; and a control unit configured to display an image generated by superimposing the model, of which orientation has been adjusted, on the reality image.

13 Claims, 10 Drawing Sheets

FIG. 3

| ID | USER NAME | ATTRIBUTE | | | HISTORY |
|----|-----------|-----------|-----|------------|---------|
|    |           | GENDER | AGE | OCCUPATION | |
| 0 | TARO | MALE | 23 | DESIGNER | - |
| 1 | HANAKO | FEMALE | 32 | ILLUSTRATOR | Human3.mod |
| 2 | JIRO | MALE | 8 | ELEMENTARY SCHOOL STUDENT | Dog1.mod |
| ... | ... | ... | ... | | |
| N | | | | | |

FIG. 4

| ID | MODEL | THUMBNAIL | ATTRIBUTE | | | START POSITION |
|---|---|---|---|---|---|---|
| | | | TYPE | | INTENDED USE | |
| 0 | Dog1.mod | Dog1.png | ANIMAL | DOG | EDUCATION | (x,y) |
| 1 | Dog2.mod | Dog2.png | ANIMAL | DOG | EDUCATION | (x,y) |
| 2 | Cat1.mod | Cat1.png | ANIMAL | CAT | EDUCATION | |
| ... | ... | ... | ... | ... | ... | |
| N | | | | | | |

FIG. 5

| ID | MODEL | ORIENTATION | | | SELECTING |
| --- | --- | --- | --- | --- | --- |
| | | POSITION | ROTATION | SCALING | |
| 0 | 0 | (x,y,z),... | (x,y,z),... | (x,y,z),... | ○ |
| 1 | 1 | (x,y,z),... | (x,y,z),... | (x,y,z),... | |
| ... | ... | ... | ... | ... | |
| N | ... | ... | ... | ... | |

FIG. 6
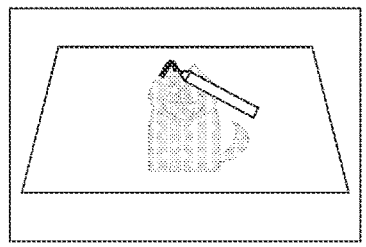
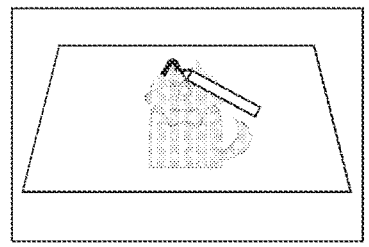
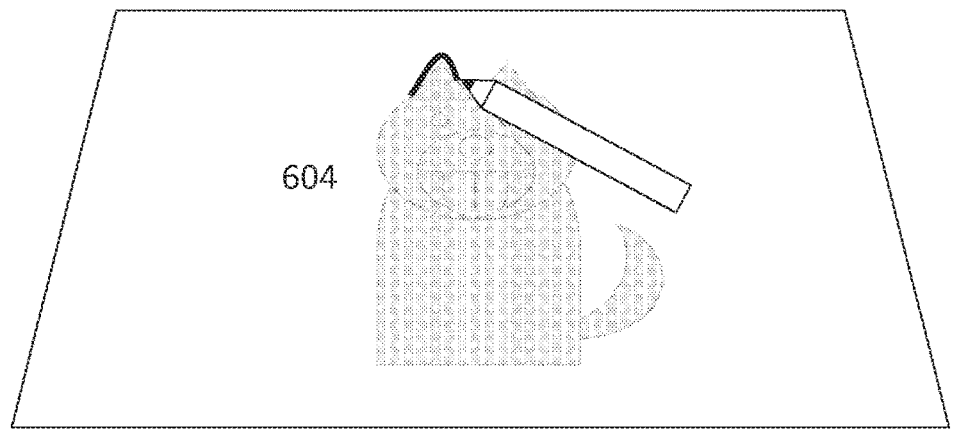

FIG. 10
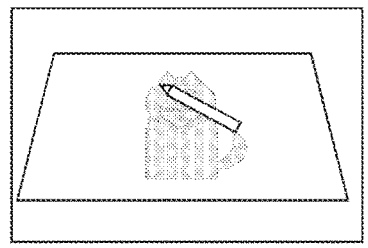
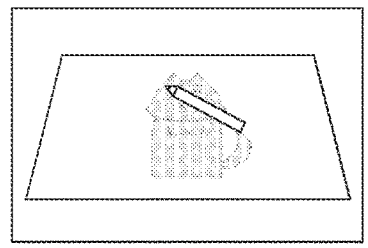
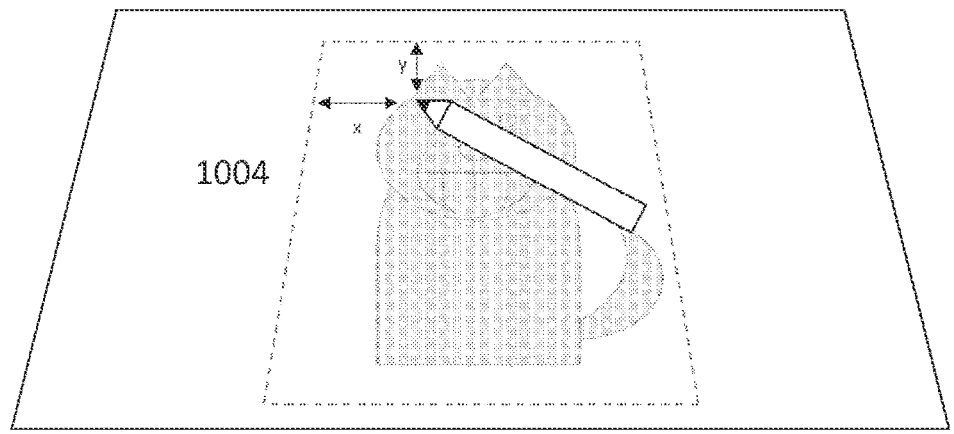

DISPLAY CONTROL APPARATUS, CONTROL METHOD, COMPUTER-READABLE MEDIUM, AND PRODUCING METHOD

BACKGROUND OF THE INVENTION

Field of the Invention

The present disclosure relates to a display control apparatus, a control method, a computer-readable medium, and a producing method.

Description of the Related Art

In recent years, techniques to provide user experiences in an environment having both reality and virtual reality, such as augmented reality (AR) and mixed reality (MR), have been advancing.

For example, unprecedented user experiences can be provided by superimposing a virtual object onto an image captured by a smartphone, or capturing a movement of the user using a head mount display (HMD) having various sensors, and displaying the movement synchronizing with the movement in a mixed reality.

AR and MR are becoming common at the personal level, and are being utilized not only in daily life and also in various learning and production environments. For example, in U.S. Patent Application Publication No. 2020/0363931, production is supported by superimposing and displaying a model on a screen of a smartphone when an illustration is drawn.

In the case of U.S. Patent Application Publication No. 2020/0363931, a drawing region (e.g. edge of paper) of a captured image is detected, and a model image, which is set in advance, is superimposed and displayed so as to follow the drawing in the drawing region. By detecting the drawing region, extra work, such as writing positioning markers, is unnecessary, which is advantageous.

However, since characteristic points are detected on a two-dimensional production region, if the sight of the production region is lost due to a change in the work environment or the like, a superimposed display may not be performed as expected.

SUMMARY OF THE INVENTION

It is an object of the present disclosure to provide a technique to effectively support production in a reality space.

The first aspect of the present disclosure is a display control apparatus comprising at least one memory and at least one processor which function as:
  a detection unit configured to detect characteristic points of a product that a user is to produce, from a reality image;
  an orientation adjustment unit configured to adjust orientation of a model so as to match with the detected characteristic points; and
  a control unit configured to display an image generated by superimposing the model, of which orientation has been adjusted, on the reality image.

The second aspect of the present disclosure is 1 control method performed by a computer, comprising:
  a characteristic point detection step of detecting characteristic points of a product that a user is to produce, from a reality image;
  an orientation adjustment step of adjusting orientation of a model so as to match with the detected characteristic points; and
  a display screen generation step of generating an image by superimposing the model, of which orientation has been adjusted, on the reality image.

Further features of the present invention will become apparent from the following description of exemplary embodiments with reference to the attached drawings.

BRIEF DESCRIPTION OF THE DRAWINGS

FIG. 3 is an example of a table of user data;

FIG. 4 is an example of a table of model data;

FIG. 5 is an example of a table of model candidates;

FIG. 6 is a diagram depicting an overview of a production support system according to Embodiment 1;

FIG. 10 is a diagram depicting an overview of a production support system according to Embodiment 3.

DESCRIPTION OF THE EMBODIMENTS

Embodiments of the present disclosure will be described with reference to the drawings. The following description is merely an example of embodiments of the present disclosure, and is not intended to limit the present disclosure. The present disclosure can be implemented in various ways within the scope of the technical spirit thereof.

The present embodiment is a production support system to support the production of a product by a user. The production support system, according to the present embodiment, superimposes and displays a model image of the product that the user is about to create on the reality image, so as to support the production by the user. The product may be a two-dimensional image (e.g. illustration) drawn on paper, a white board, or a display, or may be a three-dimensional molded object that is produced by processing such material as wood, clay or ice.

The production support system includes a display (display apparatus), a camera (imaging apparatus), an input/output device, and a computer (display control apparatus) that controls display on the display unit.

Figure 1:
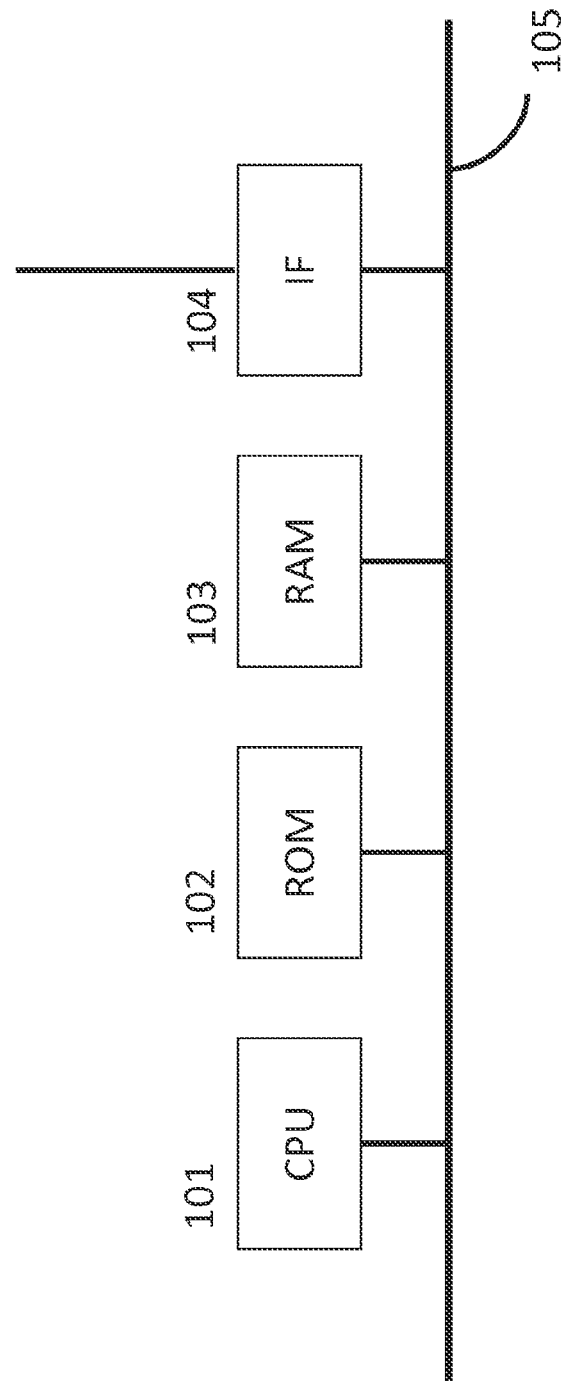
FIG. 1 is a diagram depicting an example of a hardware configuration of a production support system.

FIG. 1 is a diagram depicting an example of a hardware configuration of a computer included in the production support system 100. The production support system 100 of the present embodiment has the same configuration as a standard computer, and includes a CPU 101, a ROM 102, a RAM 103 and an I/F 104. These composing elements are connected via a bus 105. The production support system 100 is implemented by loading a computer program for implementing the functions to be described below from a computer-readable medium to the RAM 103 and the CPU 101 executing the computer program. The RAM 103 is also used as a work memory to temporarily store data for the processing executed by the CPU 101. The I/F 104 is an interface to communicate with an external device, whereby image data of the real world and data to determine the state of the user are inputted, and image data to be displayed is outputted.

In FIG. 1, only one CPU is indicated, but the image processing apparatus may be implemented using a plurality of processors. The CPU may include an auxiliary configuration, such as a graphic processing unit (GPU). Further, only the RAM 103 is indicated as a configuration to hold a temporary work memory, but a second or third storage region may be disposed in a same or different medium. The other possible media are a hard disk (HDD), a solid-state drive (SSD) and the like. The configuration of the bus 105 is not limited to this, but may be a multi-stage configuration in which composing elements are connected.

Figure 2:
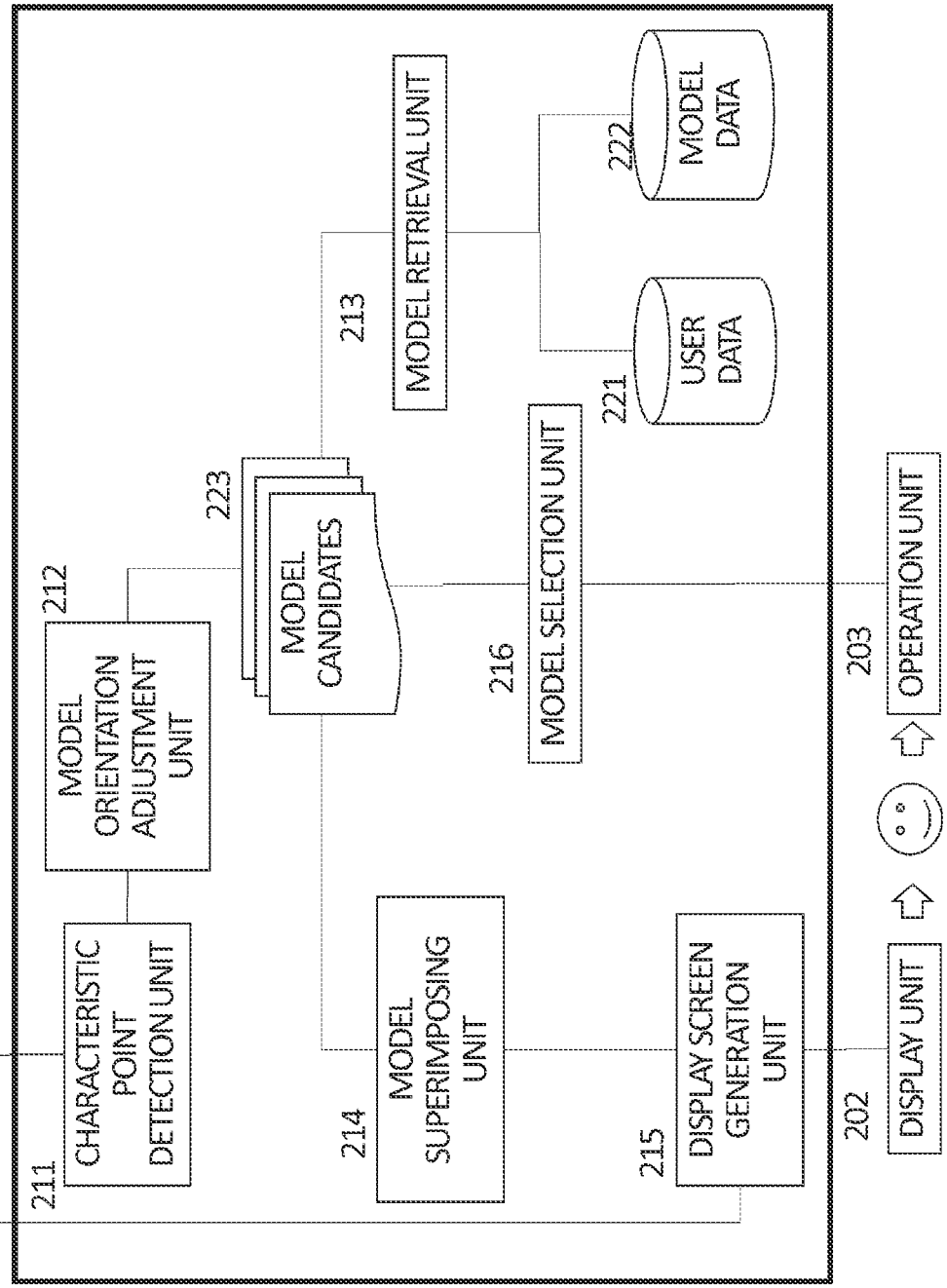
FIG. 2 is a diagram depicting an example of a software logic configuration of the production support system.

FIG. 2 is a diagram depicting an example of a software logic configuration of the production support system 100. This software logic configuration is common to all the embodiments.

In user data 221, information on the at tributes of the user, operation history of the past thereof, and the like, is stored. In model data 222, a plurality of models to support production by the user are stored. The data format of the model data 222 is not especially limited, and may be two-dimensional data or three-dimensional data.

In model data 222, a model retrieval unit 213 retrieves one or a plurality of models, which are candidates of the model to be superimposed and displayed on the reality image to support production. For example, the model retrieval unit 213 executes retrieval before starting the production in accordance with the attribute information of the user registered by the user, or input information on what will be produced. A model candidate 223 indicates one or a plurality of models selected by the model retrieval unit 213.

A characteristic point detection unit 211 acquires a reality image capturing a field-of-view of the user from the imaging unit 201, and detects the characteristic points of the product that the user is to produce. The characteristic point detection unit 211 may be implemented using a conventional technique such as SIFT and HOG.

A model orientation adjustment unit 212 adjusts the orientation of the model registered in model candidates 223, so that the orientation of the model matches with the detected characteristic points. Specifically, the model orientation adjustment unit 212 performs at least one of positioning, rotation and scaling of the model, so as to adjust the orientation of the model in various ways, and specify the orientation that matches with the detected characteristic points to the highest degree. The adjustment method of the orientation is not especially limited. For example, the model orientation adjustment unit 212 may determine the adjustment method based on the detected characteristic points and the orientation of the model, or may adjust a plurality of orientations of the model using a predetermined method, and select an adjustment method with which the orientation of the model matches with the detected characteristic points to the highest degree. Further, the model orientation adjustment unit 212 may determine the adjustment method using a model learned by machine learning. The specified orientation is stored in the model candidates 223 as an orientation when the model is superimposed on the reality image. If there are a plurality of adjustment methods for the orientation to match one model with the detected characteristic points, each of the models after the adjustment may be stored in the model candidates 223.

A model superimposing unit 214 generates an image by superimposing a model candidate 223, of which orientation has been adjusted, on a reality image captured by the imaging unit 201. The model superimposing unit 214 uses orientation information determined by the model orientation adjustment unit 212 when the model candidate 223 is superimposed on the reality image.

A display screen generation unit 215 generates a screen which is to display the image generated by the model superimposing unit 214 as the model candidate presentation image, and outputs the screen to the display unit 202. The model superimposing unit 214 and the display screen generation unit 215 can be regarded as a display control unit to control the display on the display unit 202.

A model selection unit 216 sets a mode, which the user selected from the presented models using the operation unit 203, in the model candidates 223 as a model to be continuously displayed in the superimposed state.

Hereafter the model orientation adjustment unit 212 and the model superimposing unit 214 perform the orientation adjustment of the model and the superimposing processing on the reality image only for the selected model. Further, the display screen generation unit 215 generates a screen to continuously display the image, which was generated by the model superimposing unit 214, on the entire field-of-view of the HMD as the final image, and outputs the screen to the display unit 202. The user data 221 and the model data 222 described in the present logic configuration may be a configuration to store data on an external storage device via a network.

FIG. 3 is an example of a table of user data stored in the user data 221. "ID" indicates an ID unique to each user. "User Name" indicates a name to identify each user. The user name may be an actual name or an account name represented by a mail address or the like. "Attribute" indicates attribute information to classify the user. The attribute may include such an attribute as gender, age and occupation. "History" indicates information on the model data which the user used in the past. The history may be only data which was used recently, or may be a list of data which was used during a predetermined period in the past.

FIG. 4 is an example of a table of the model data stored in the model data 222. As indicated in FIG. 4, the model data is stored in the storage unit, and is corresponded with the ID, thumbnail, attribute and start position.

"ID" indicates an ID uniquely assigned to each model data.

"Model" indicates the content of the model data. The data format of the model data is not especially limited. For example, in the case of supporting a two-dimensional production, such as drawing an illustration, the model may be two-dimensional data, or may be three-dimensional data. In the case of supporting three-dimensional production, such as making a plastic model, using three-dimensional data is preferable but two-dimensional data may be used instead. Thus the data format of the model may be determined in accordance with the intended use.

"Thumbnail" indicates a snap shot image of the model in an arbitrary orientation. For example, in the case where a model is displayed in the presentation frame, the thumbnail is displayed at a corner of the presentation flame so as to easily identify the model that is in use. The data format of the thumbnail may be determined in accordance with the intended use.

"Attribute" indicates attribute information to classify the model. The attribute information may include secondary category classification, such as "type" which indicates the characteristic of the model itself and "scene" which indicates the case where the model can be used.

"Start position" indicates the start position when the model is drawn. Based on the assumption that the model data is drawn in a two-dimensional drawing region having a specific size, the start position is indicated by coordinates when the upper left is the start point, the abscissa is the x axis and the ordinate is the y axis. The start position is used to determine the position of the model that is superimposed on the drawing by the user, in accordance with the position where the user placed the pen. One start position may be defined for each model, or a plurality (e.g. two or four) of start positions may be defined. In the case where two start positions are defined, the drawing region may be divided into two (left and right), so that the coordinate information to be used is selected depending on the region (upper left or upper right) where drawing started. In the case where four start positions are defined, the drawing region may be divided into 2×2 regions, so that the coordinate information to be used is selected depending on the region (upper left, upper right, lower left or lower right) where drawing started. The specific way of using the "start position" will be described in Embodiment 3.

FIG. 5 is an example of a table of the model data, which is stored in the model candidates 223. "ID" indicates an ID unique to each model candidate. "Model" indicates an ID unique to each data of the model included in the table of the model data. "Orientation" indicates an orientation when the model matches with the current characteristic points. The orientation data is constituted of the position, rotation and scaling. The position indicates a moving distance of the model from the initial coordinates for each component of the (x, y, z) axis. The rotation indicates a moving distance of the model from the initial position for each component of the (x, y, z) axis. The scaling indicates the magnification of the scaling of the model with respect to the initial size for each component of the (x, y, z) axis. If there is no orientation that matches with the characteristic points, nothing is indicated, "Selecting" indicates that this model is a final model that is continuously displayed on the entire field-of-view of the HMD.

Embodiment 1

FIG. 6 is a diagram depicting an example of a screen which the production support system according to the present embodiment displays on the HMD worn by the user.

A screen 601 indicates a screen that is displayed on the entire field-of-view of the HMD. On the screen 601, an image of a reality space and an image generated by the production support system 100 are superimposed and displayed. In FIG. 6, paper, a pen and a line drawn on the paper compose the image of the reality space, and a model image 604 is superimposed on this image of the reality space. This model image which is superimposed and displayed on the actual product is called a "support image" in the following description.

The presentation frames 602 and 603 are presentation frames in which a candidate of the model is superimposed and displayed. An image display in the presentation frame 602 or 603 is called a "presentation image". In Embodiment 1, the user registers that a "dog" is drawn in the production system in advance. Then only the model data having attribute information of "dog" is selected as candidates of the model. On the screen 601, an image of the hand of the user is displayed. When the user starts drawing, the system detects the characteristic points of the drawing result from the image, and select models matching with the characteristic points by adjusting the orientation (positioning, rotation, scaling), out of the models of "dog". The models which were selected are superimposed on the reality image so as to match with the characteristic points, and is displayed in the presentation frames 602 and 603. In this example, two models are displayed, but three or more models may be displayed. In a case where a plurality of candidates become presentation targets, the presentation sequence is in the descending order of the degree of matching, and in a case where a higher number of models than the number of presentation frames become the presentation targets, new candidates of the model may be successively displayed by such a user operation as a gesture. If the user selects a model to be continuously displayed in the superimposed state, out of the presented model images, the model image 604 is displayed on the screen 601 in the superimposed state on the reality image. Hereafter the selected model image is continuously displayed in the orientation following up the characteristic points of the drawing result.

Figure 7:
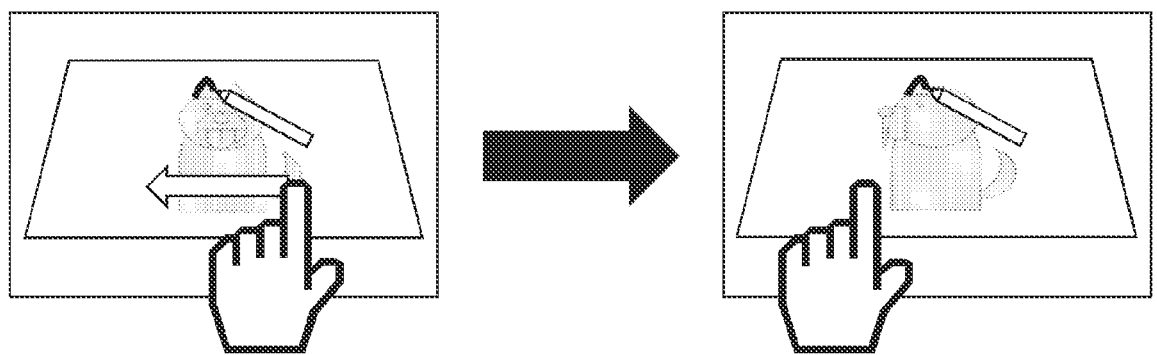
FIG. 7 is a diagram depicting an example of a method of presenting a candidate in a presentation frame according to Embodiment 1.

The model data in the present embodiment may be two-dimensional data, or may be three-dimensional data. For the images displayed in the presentation frames, same models, of which coordinates of characteristic points are partially the same but orientations are different, may be handled as the same presentation candidates. In this case, as illustrated in FIG. 7, the orientation of the model can be freely changed by the gesture of the user, while maintaining part of the coordinates of the characteristic points.

Figure 8:
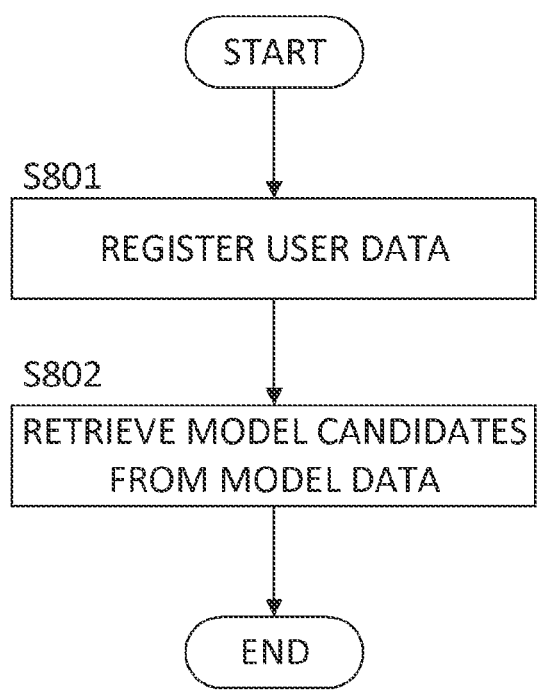
FIG. 8 is a flow chart of retrieving a model candidate according to Embodiment 1.

FIG. 8 is a flow chart of the initial setting according to Embodiment 1. The processing in FIG. 8 is performed as the initial setting before the user starts actual production.

In step S801, the production support system 100 registers the user data based on the input from the user. In Embodiment 1, the production support system 100 receives the specification of the type of the product to be produced from the user, and registers the received type of the product as the user data 221. For example, in a case where the user wants to draw a picture of a "dog", "dog" is registered in the user data 221 as a type of product to be produced.

Step S802 is a processing step performed by the model retrieval unit 213, where data to become model candidates is retrieved from the entire model data. In the case where the type of the product has been specified, the model retrieval unit 213 selects models, of which attributes are matched with the type specified in the model data 222, are selected as the model candidates.

For example, in the case where it is registered that a picture of a "dog" will be drawn, the model retrieval unit 213 selects a model, of which attribute is "dog", from the model data, as the model candidate.

Figure 9:
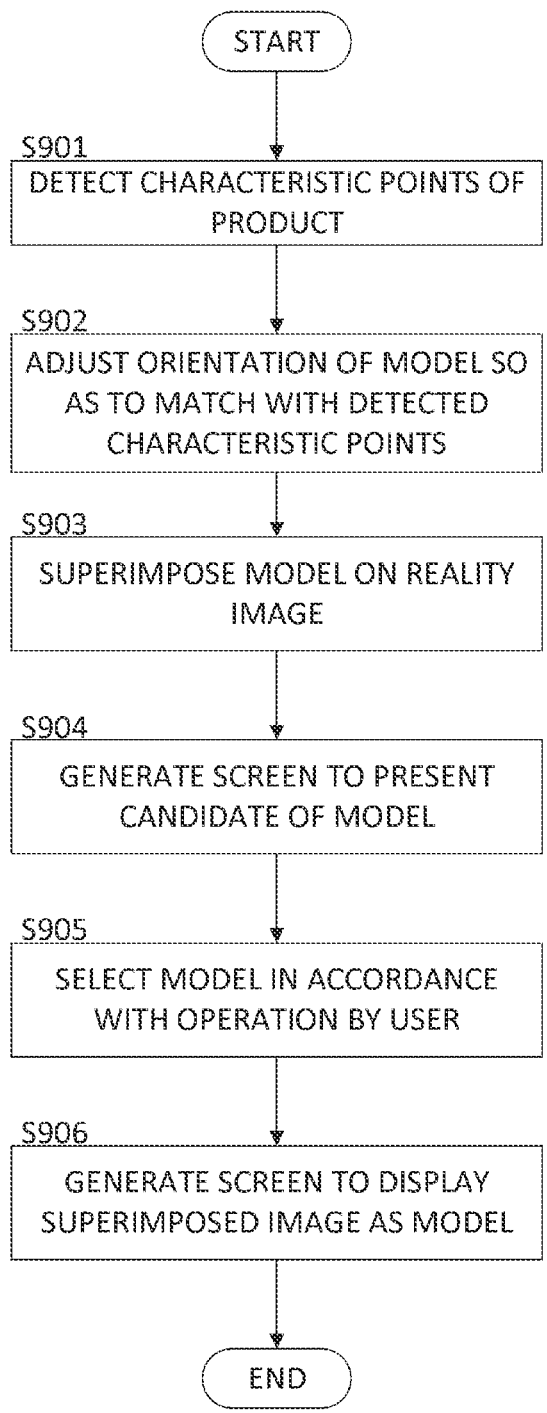
FIG. 9 is a flow chart of determining a model according to Embodiment 1.

FIG. 9 is a flow chart depicting steps up to determining the model according to Embodiment 1.

In step S901, the characteristic point detection unit 211 detects characteristic points from the drawing result of the product captured as the field-of-view image of the user.

In step S902, for the model data selected as the model candidate, the model orientation adjustment unit 212 adjusts the orientation of the model so as to match with the characteristic points detected in step S901. The result of the calculated orientation is reflected in the orientation attribute of the model candidate.

In step S903, as model candidates, the model superimposing unit 214 generates an image in order to present a plurality of models which were selected as the model candidates to the user. Specifically, the model superimposing unit 214 adjusts the orientation of the model data with reference to the orientation attribute reflected in each model candidate, and generates an image where the model after adjusting the orientation is superimposed on the reality image.

In step S904, the display screen generation unit 215 generates the presentation screen to display the image generated in step S903 in the presentation frame.

In step S905, when the user selected a model to be displayed as the support image, out of the model candidates presented in step S904, the model selection unit 216 registers this model in the system as the support image.

In step S906, for the model of the support image which was set in step S905, the display screen generation unit 215 generates a screen for displaying the superimposed image generated by the model superimposing unit 214 on the display unit.

Hereafter, detection of the characteristic points by the characteristic point detection unit 211, adjustment of the model orientation by the model orientation adjustment unit 212 and superimposing of the model by the model superimposing unit 214 are continued for the model which the user selected in step S905, although this continuation is not included in the flow chart.

According to Embodiment 1, only by specifying a type of product that will be produced, an appropriate model can be selected, superimposed and displayed on the reality image, whereby the user can receive the support of the production. A model is selected based on the pre-specified type and the characteristic points of the product the user actually produced, hence an appropriate model is selected without the user specifying a specific model in advance. Further, the orientation of the model is adjusted so as to match with the characteristic points of the product, hence the model can follow the actual production. Furthermore, four corners of the drawing region are not used to determine the orientation of the model, hence the model can continuously displayed, following the actual production, even if the sight of the four corners of the drawing region is lost.

Embodiment 2

In Embodiment 1, the user specifies a type of product to be produced, but in Embodiment 2, a model is selected without specifying the type of product. Specifically in Embodiment 2, a model is selected based on the attribute information of the user.

The screen displayed by the production support system 100 is the same as Embodiment 1 (FIG. 6). In Embodiment 2, in step S801 in the initial processing (FIG. 8), the user registers the attribute information of the user in the production system in advance as the user data 221. In step S802, the model retrieval unit 213 selects models matching with the user attribute as model candidates. For example, in a case where "elementary school student" is included in the attributes of the user, models having "education" as a related attribute of a model are selected. The correlation of the attributes of the user and the attributes of the models may be determined in advance, for example. The sequence of the models to be presented in the presentation frames 902 and 903 may be a sequence in which the degree of matching with the user attribute is also considered, in addition to the degree of matching with the characteristic points.

In Embodiment 2 as well, effects similar to Embodiment 1 can be acquired. The model candidates may be extracted using both the type of product and the user attributes, combining Embodiment 1 and Embodiment 2.

Embodiment 3

In Embodiment 3, the display position of the model is determined considering the start position of the drawing by the user.

FIG. 10 is a diagram depicting an example of a screen displayed by the production support system according to the present embodiment. The screen 1001 indicates a screen which is displayed on the entire field-of-view of the HMD. The presentation frames 1002 and 1003 are presentation frames that indicate candidates of the model to be superimposed and displayed. In Embodiment 3, it is assumed that the user has determined a model to be used for drawing in advance.

In Embodiment 3, the system detects the start position of the drawing by the user (position where the pen is placed as a characteristic point. The system matches the display position of the model with the detected start position of the drawing with reference to the attribute information of the start position of the model, and superimposes and displays the model image. Specifically, the model orientation adjustment unit 212 adjusts so that the start position included in the model data (see FIG. 4) matches with the start position of the drawing by the user. The orientation of the model other than the position (that is, rotation and scaling) may be determined as required. For example, the rotation may be set as an orientation when the user selected the model. The scaling may be a maximum size with which an arbitrary margin can be maintained with respect to the drawing region, or may be a size determined in advance.

In Embodiment 3, the start position of the image may be determined depending on the specific region of the drawing region in which the position where the pen is placed. As mentioned above, a plurality of drawing start positions may be corresponded to the model data 222, and stored in this state. For example, in the model data 222, the drawing region may be divided into two (left and right), and the start position may be defined as the region where the drawing was started. In this case, the model orientation adjustment unit 212 uses a start position which corresponds to the specific region of the drawing region where the user started. For example, in the case where the user placed the pen on the upper left of the drawing region, the upper left coordinates of the start position (FIG. 4) are used. In the case where the user placed the pen at the upper right thereof, the upper right coordinates of the start position (FIG. 4) are used. Cases of the lower left and lower right are regarded in the same manner.

Hereafter, the model orientation adjustment unit 212 adjusts the orientation of the model so that the model follows the drawing by the user in accordance with the start position of the drawing.

According to Embodiment 3, the drawing position of the model can be determined in accordance with the start position of the drawing by the user, hence the model can be continuously displayed, following the drawing, even if the sight of the four corners of the drawing region is lost.

In the above description, it is assumed that the model has been determined in advance, but the model may be selected in accordance with the start position of the drawing. Selection of the model based on the start position of the drawing may be performed based on the model data which is registered in advance, or may be performed based on the history of the user in the past (correlation between the drawing start position and type of product). In the case where a plurality of candidates are selected, the presentation frames 1001 and 1002 may be presented just like Embodiment 1, so that the user can select the candidate to be used. Then the step of specifying the model in advance can be omitted.

Embodiment 4

In Embodiment 4, three-dimensional production is supported. In Embodiment 4, as characteristic points, the system detects the characteristic points of a two-dimensional image capturing a three-dimensional product. The characteristic points of a product which the user carved by such processing as cutting are detected, and a match with the specific orientation of the model is determined two-dimensionally, and is superimposed. The logic when the model is superimposed is the same as the case of two-dimensional processing, hence description here is omitted.

Other Embodiments

Embodiments 1 to 4 are merely examples, and configurations that are acquired by, appropriately modifying or changing the configurations of Embodiments 1 to 4 within the scope of the spirit of the present disclosure are also included in the present disclosure.

The present disclosure may be implemented as a head mount display which includes a display and a camera, or may be implemented using a smartphone which is worn on the head of the user like goggles. The present disclosure may be implemented as a computer (display control apparatus) to which at least one of a display and a camera is connected externally, or as a computer program that causes the computer to function as a display control apparatus.

The present disclosure may be regarded as a method for producing a product using the production support system. In other words, the present disclosure may be regarded as a producing method including: a step of confirming a model displayed by the product support system (display control apparatus); and a step of drawing an image or processing a material based on the displayed model. By producing a product while receiving support of the production support system like this, the user can easily produce a product by following the model.

The present disclosure may also be implemented as a processing, where a program, which implements at least one function of the above embodiments, is supplied to the system or the apparatus via a network or a storage medium, and the system or at least one processor of the computer of the apparatus reads and executes the program. The present disclosure may also be implemented as a circuit (e.g. ASIC) which implements at least one of the above mentioned functions. Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-162642, filed on Oct. 1, 2021, which is hereby incorporated by reference herein in its entirety.

According to the present disclosure, the production in the reality space can be effectively supported.

What is claimed is:

1. A display control apparatus comprising at least one memory and at least one processor which function as:
   a retrieval unit configured to retrieve a model to be superimposed and displayed on a reality image, from a plurality of model data stored in a storage unit;
   a detection unit configured to detect characteristic points of a product that a user is to produce, from the reality image;
   an orientation adjustment unit configured to adjust orientation of the model so as to match with the detected characteristic points; and
   a control unit configured to display an image generated by superimposing the model, of which orientation has been adjusted, on the reality image,
   wherein the orientation adjustment unit is further configured to adjust the orientation of the model by performing at least one of rotation, movement and scaling on the model, and
   wherein in a case where a plurality of methods of adjusting the orientation to match with the detected characteristic points exist for one model data, the control unit is further configured to generate a screen to present each adjusted model data as a candidate of the model to the user.

2. The display control apparatus according to claim 1, wherein the model data is stored in the storage unit in association with an attribute; and
   wherein the retrieval unit is further configured to retrieve a model that matches with an attribute of the model specified by the user.

3. The display control apparatus according to claim 1, wherein the model data is stored in the storage unit in association with an attribute, and
   wherein the retrieval unit is further configured to retrieve a model having an attribute that matches with an attribute of the user.

4. The display control apparatus according to claim 1, wherein the control unit is further configured to generate images to be presented to the user using a plurality of models retrieved by the retrieval unit as candidates of the model, and determine a candidate of the model selected by the user as the model to be superimposed on the reality image.

5. The display control apparatus according to claim 1, wherein the model data is stored in the storage unit in association with a start position of a drawing as an attribute,
   wherein the detected unit is further configured to detect a start position of production by the user, and
   wherein the orientation adjustment unit is further configured to adjust the orientation of the model so that the start position of the production by the user matches with the start position of the drawing stored as an attribute of the model data.

6. The display control apparatus according to claim 5, wherein the model data is stored in the storage unit in association with a plurality of start positions of the drawing, and wherein the orientation adjustment unit is further configured to select any one of starting positions of the drawing in accordance with attribute information of the user or the start position of the production by the user, and adjust the orientation of the model so that the start position of the production by the user matches with the selected starting position of the drawing.

7. The display control apparatus according to claim 1, wherein the reality image is an image capturing a field-of-view of the user.

8. The display control apparatus according to claim 1 further comprising:
   an imaging unit configured to acquire the reality image; and
   a display unit configured to display an image generated by the control unit.

9. The display control apparatus according to claim 1, wherein the product is a two-dimensional product.

10. The display control apparatus according to claim 1, wherein the product is a three-dimensional product.

11. A control method performed by a computer, comprising:
   retrieving a model to be superimposed and displayed on a reality image, from a plurality of model data stored in a storage unit;
   detecting characteristic points of a product that a user is to produce, from the reality image;
   adjusting orientation of the model so as to match with the detected characteristic points; and
   generating an image by superimposing the model, of which orientation has been adjusted, on the reality image, wherein the orientation of the model is adjusted by performing at least one of rotation, movement and scaling on the model, and wherein in a case where a plurality of methods of adjusting the orientation to match with the detected characteristic points exist for one model data, the generating the image includes generating a screen to present each adjusted model data as a candidate of the model to the user.

12. A non-transitory computer-readable medium storing a computer program to cause a computer to function as each unit of the display control apparatus according to claim 1.

13. A display control apparatus comprising at least one memory and at least one processor which function as:
   a retrieval unit configured to retrieve a model to be superimposed and displayed on a reality image, from a plurality of model data stored in a storage unit;
   a detection unit configured to detect characteristic points of a product that a user is to produce, from the reality image;
   an orientation adjustment unit configured to adjust orientation of the model so as to match with the detected characteristic points; and
   a control unit configured to display an image generated by superimposing the model, of which orientation has been adjusted, on the reality image, wherein the model data is stored in the storage unit in association with a start position of a drawing as an attribute, wherein the detected unit is further configured to detect a start position of production by the user, and wherein the orientation adjustment unit is further configured to adjust the orientation of the model so that the start position of the production by the user matches with the start position of the drawing stored as an attribute of the model data.

* * * * *